US010367805B2

(12) United States Patent
Chen

(10) Patent No.: US 10,367,805 B2
(45) Date of Patent: Jul. 30, 2019

(54) METHODS FOR DYNAMIC USER IDENTITY AUTHENTICATION

(71) Applicant: AirSig Inc., Grand Cayman (KY)

(72) Inventor: Po-Kai Chen, Taoyuan (TW)

(73) Assignee: AirSig Inc., Grand Cayman (KY)

( * ) Notice: Subject to any disclaimer, the term of this patent is extended or adjusted under 35 U.S.C. 154(b) by 219 days.

(21) Appl. No.: 15/414,646

(22) Filed: Jan. 25, 2017

(65) Prior Publication Data

US 2018/0212947 A1    Jul. 26, 2018

(51) Int. Cl.
*H04L 29/06* (2006.01)
*H04W 12/06* (2009.01)
*H04W 12/10* (2009.01)

(52) U.S. Cl.
CPC .......... *H04L 63/083* (2013.01); *H04L 63/126* (2013.01); *H04W 12/06* (2013.01); *H04W 12/10* (2013.01)

(58) Field of Classification Search
None
See application file for complete search history.

(56) References Cited

U.S. PATENT DOCUMENTS

| 8,819,812 B1* | 8/2014 | Weber ............... G06F 3/017 726/19 |
| 2010/0225443 A1* | 9/2010 | Bayram .............. G06F 21/316 340/5.83 |
| 2011/0156867 A1* | 6/2011 | Carrizo .............. G06K 9/00167 340/5.85 |
| 2012/0007713 A1* | 1/2012 | Nasiri ................. G06F 1/1694 340/5.81 |
| 2012/0212414 A1* | 8/2012 | Osterhout ........... G02B 27/017 345/158 |
| 2013/0005383 A1* | 1/2013 | Isberg ................... H04W 4/00 455/517 |
| 2015/0113282 A1* | 4/2015 | Basil .................. H04L 63/0861 713/176 |
| 2015/0365515 A1* | 12/2015 | Chen .................... G06F 21/445 455/411 |
| 2016/0212113 A1* | 7/2016 | Banerjee .............. H04L 63/083 |
| 2016/0212132 A1* | 7/2016 | Banerjee .............. H04L 63/10 |
| 2016/0212141 A1* | 7/2016 | Banerjee ............ H04L 63/0846 |

* cited by examiner

*Primary Examiner* — Maung T Lwin
(74) *Attorney, Agent, or Firm* — Guice Patents PLLC

(57) ABSTRACT

Disclosed herein are methods for dynamic user Identity authentication for authenticating the identity of a user of a login device. In some embodiments, the method includes the following steps: using a web server to receive an access request from the login device, generate a resource address information and a session identifier, and transmit the same to the login device; using the login device to generate an initiation signal and transmit the same to a signing device thereby initiating an air signature procedure to generate a target signature, wherein the signing device includes a motion sensor configured to sense movement features produced when the user moves the signing device; using a determination module to determine whether the target signature matches a reference signature and generate a authentication information based on the determination; and using the web server to determine whether the access request is granted based on the authentication information.

15 Claims, 4 Drawing Sheets

METHODS FOR DYNAMIC USER IDENTITY AUTHENTICATION

CROSS-REFERENCE TO RELATED APPLICATION

This application relates to and claims the benefit of U.S. patent application Ser. No. 15/007,268, filed Jan. 27, 2016, the content of which is incorporated herein by reference in its entirety.

BACKGROUND OF THE INVENTION

1. Field of the Invention

The present disclosure relates to methods for user identity identification; more particularly, to methods for dynamic user identity identification.

2. Description of Related Art

With the advancement of Internet technology, users may access internet services or contents with many kinds of electronic devices. To protect the privacy of the user's account, as well as to ensure the safety of the transaction or service, the access to many of such service or content is restricted. In other words, the user has to identify his/her identity through a authentication process before accessing these restricted services or contents.

Conventionally, the user is prompted to provide his/her user name and password to authenticate his/her identity. However, in the case where the password is stolen or decrypted by others, someone else may impersonate the user who owns the account. In other words, conventional methods for user identity authentication cannot make sure whether the persons providing the user ID and password is the authentic user of the account.

On the other hand, different websites may have different rules for creating the user ID and the password, so the user may have to manage many combinations of the user ID and password, which is quite burdensome.

To address the above issues, some authentication mechanisms using bio-information have been developed; for example, the user's fingerprint, voice, or facial features can be used for that purpose. For example, some internet service may ask the electronic device to take a photo of the user and use a facial feature recognition technology to identify the user's identity. However, such authentication method can only provide a certain level of extra protection, and cannot completely prevent others from impersonating the true user. Take facial feature recognition as an example, the imposter may use the true user's photograph to pass the authentication. Moreover, not all electronic devices are equipped with the component for capturing bio-information, and hence, the application of this technology is somewhat limited.

In view of the foregoing, there exists a need in the art for providing a more convenient yet secure approach for authenticating the user's identity.

BRIEF SUMMARY OF THE INVENTION

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present disclosure is directed to a method for dynamic user Identity authentication. The present method is at least characterized in that it uses the air signature authentication to increase the security of internet access. Further, in some embodiments, the air signature authentication is used to replace the conventional authentication process of user ID and/or password, thereby simplifying the user Identity authentication process. Moreover, in optional embodiments, the present method for dynamic user Identity authentication further examines whether the signing device used during the air signature authentication is the registered signing device, which further increases the security of the user's account.

According to some embodiments of the present invention, the dynamic user Identity authentication method for authenticating the identity of a user of a login device comprises the steps as follows. First, the method uses a web server to receive an access request from the login device. Next, the method uses the web server to generate a resource address information and a session identifier (session ID) based on the received access request, and transmitting the resource address information and session ID to the login device. Thereafter, the method uses the login device to generate an initiation signal and transfers the same to the signing device, wherein the initiation signal comprises the resource address information and session ID. The method then uses the signing device to initiate an air signature procedure based on the received initiation signal to generate a target signature, wherein the signing device comprises a motion sensor configured to detect one or more motion features that are generated when the user moves the signing device. Then, the method uses a determination module to determine whether the target signature matches a reference signature, generate an authentication information based on the determination result, and transmit the authentication information to the web server according to the resource address information; said authentication information comprises a signature similarity information and the session ID. The method then uses the web server to determine whether the access request is granted based on the received authentication information.

According to optional embodiments, the access request from the login device further comprises a user ID that is inputted into the login device. Still optionally, the access request from the login device further comprises a user ID and password that are inputted into the login device.

According to various embodiments of the present invention, the initiation signal that is generated by the login device and transmitted to the signing device can be encoded as optically recognizable data, audio tones, or data for transmission over one or more communication protocols.

According to certain embodiments of the present invention, the motion sensor of the signing device is configured to detect one or more of the following motion features generated when the user moves the signing device: a movement direction, acceleration, and angular velocity.

In optional embodiments of the present invention, the determination module comprises one or more pre-stored reference signatures, and the determination module is configured to compare the similarity of the movement direction, acceleration and/or angular velocity between the target signature and the reference signature, and when the similarity is higher than a threshold, the determination module is configured to determine that target signature matches reference the signature.

In some embodiments, the determination module is disposed within the signing device; alternatively, the determination module is disposed within an air signature authentication server.

According to some optional embodiments, the authentication information further comprises a device identifier of the signing device. In these embodiments, the present authentication method further comprises the steps of, using the web server to compare the device identifier and a device identifier associated with the user to obtain a comparison result; and using the web server to determine whether the access request is granted based on the signature similarity information and comparison result.

In another aspect, the present invention is directed to a method for dynamic user Identity authentication; the method is characterized in that it uses the air signature authentication technology, in connection with the device identifier, so as to increase the security and convenience of internet access.

According to certain embodiments of the present invention, the present method for dynamic user Identity authentication comprises the following steps. First, the method uses the web server to receive an access request from the login device. Next, the method uses the web server to generate a resource address information and a session ID based on the access request and transfer the same to the login device. Thereafter, the method uses the login device to generate an initiation signal that comprises the resource address information and session ID, and to transmit the initiation signal to the signing device. The method then uses the signing device to initiate the air signature procedure based on the initiation signal to generate a target signature, wherein the signing device comprises a motion sensor that is configured to detect motion features generated when the user moves the signing device. Then, the method uses the determination module within the signing device to determine whether the target signature matches a reference signature, and when the target signature matches the reference signature, the method uses the determination module to generate an authentication information comprising the session ID and the device identifier, and transmits this authentication information to the web server. Next, the method uses the web server to compare the device identifier and a device identifier associated with the user to obtain a comparison result. Thereafter, the method uses the web server based on comparison result to determine whether the access request is granted.

As could be appreciated, the various embodiments described above in connection with the first aspect of the present invention are also applicable here, where possible.

In yet another aspect, the present invention is directed a method for dynamic user Identity authentication; the method is characterized in that it uses the air signature authentication technology to improve the security of internet access. Moreover, the present method uses a signing device without interacting with a web server, thereby providing a more convenient authentication procedure.

According to certain embodiments of the present invention, the method comprises the following steps. First, the method uses a signing device to generate a target signature; in particular, the signing device comprises a motion sensor and has an air signature procedure stored therein so that it detects motion features generated when the user moves the signing device. Next, the method uses a determination module to determine whether the target signature matches a reference signature. When the target signature matches the reference signature, the present method then uses the determination module or the signing device to generate a authentication pass indication, and transmits this authentication pass indication to the login device.

In some optional embodiments, the authentication pass indication comprises a user ID and password, but does not comprise a resource address information. In this case, the present method comprises the step of using a login device to receive an input of the resource address information, and using the login device to import the user ID and password in the authentication pass indication to complete the login process.

In some other optional embodiments, the authentication pass indication comprises the resource address information and the user ID and password at the same time. In this case, the present method comprises the step of using the login device to import the resource address information and the user ID and password to complete the login process.

According to another optional embodiment, the authentication pass indication comprises the resource address information but do not comprise a user ID and password. In these embodiments, the login device further comprises a plugin module, the plugin module has a user ID and password stored therein; in these cases, the present method uses the plugin module to import the resource address information of the authentication pass indication and then import the user ID and password stored in the plugin module to complete the login process.

As could be appreciated, another aspect of the present invention is directed to a computer storage medium. The computer storage medium has computer readable instructions stored therein, which when executed, is configured to perform the method for dynamic user Identity authentication according to the above-mentioned aspect/embodiments of the present invention.

On the other hand, another aspect of the present invention is directed to a system configured to perform the present method for dynamic user Identity authentication. For example, the system may comprise a login device and a signing device. In some embodiments, the system further comprises a web server and/or an air signature authentication server.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where.

Figure 1:
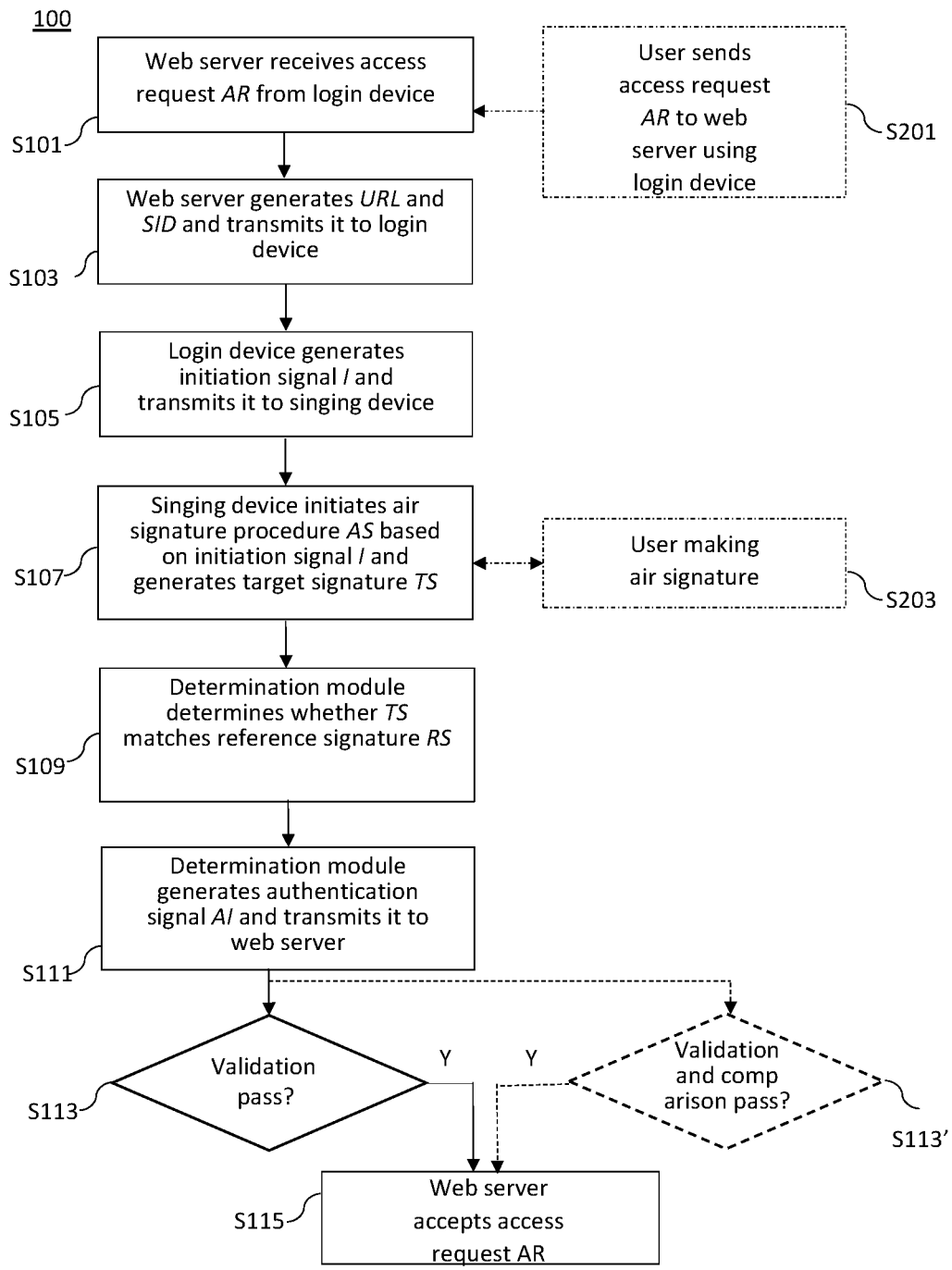
FIG. 1 is a flow chart illustrating a method for dynamic user Identity authentication according to one embodiment of the present invention.

In accordance with common practice, the various described features/elements are not drawn to scale but instead are drawn to best illustrate specific features/elements relevant to the present invention. Also, like reference numerals and designations in the various drawings are used to indicate like elements/parts.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the examples and the sequence of steps for constructing and operating the examples. However, the same or equivalent functions and sequences may be accomplished by different examples.

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Also, as used herein and in the claims, the terms "at least one" and "one or more" have the same meaning and include one, two, three, or more. Furthermore, the phrases "at least one of A, B, and C", "at least one of A, B, or C" and "at least one of A, B and/or C," as use throughout this specification and the appended claims, are intended to cover A alone, B alone, C alone, A and B together, B and C together, A and C together, as well as A, B, and C together.

In one aspect, the present invention is directed to a method for dynamic user Identity authentication. When a user attempts to access a restricted internet service or content through a login device, the present method for dynamic user Identity authentication can be initiated to authenticate whether the user is the real user of the account to ensure the security of the account.

Figure 2:
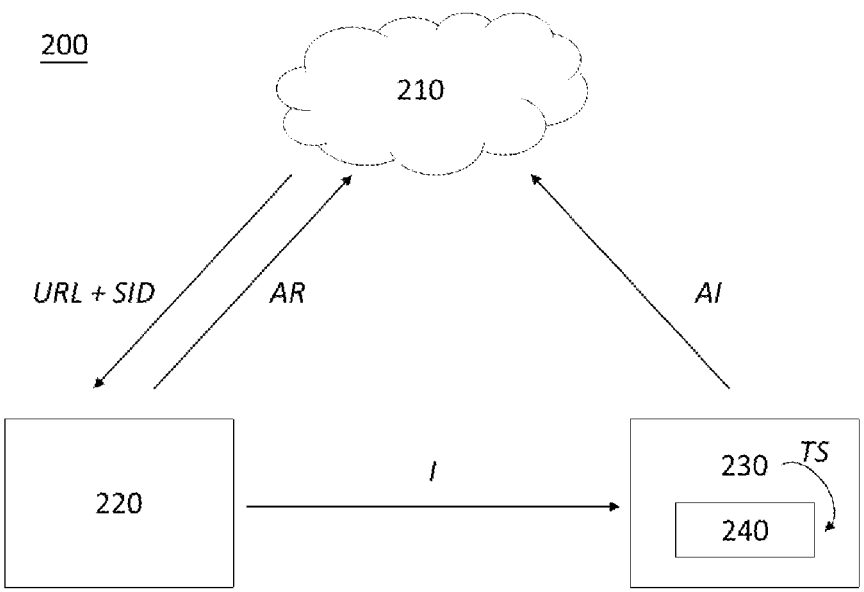
FIG. 2 is a schematic diagram of a system configured to perform the method 100 for dynamic user Identity authentication and the interaction among the devices/components according to one embodiment of the present invention.
Figure 3:
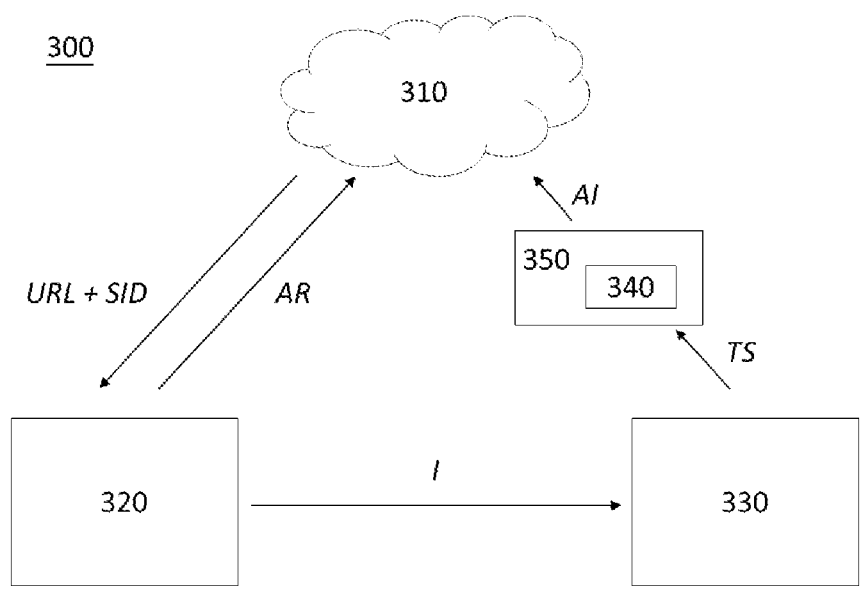
FIG. 3 is a schematic diagram of a system configured to perform the method 100 for dynamic user Identity authentication and the interaction among the devices/components according to another embodiment of the present invention.

The flow diagram in FIG. 1 illustrates an exemplary method 100 for dynamic user Identity authentication; as illustrated, the method steps of the present embodiment are illustrated as boxes of solid lines (steps S101-S115); while the steps involving the user interaction are illustrated in dotted lines (steps S201 and S203); additionally, steps according to alternative embodiments of the present disclosure are illustrated in broken lines (step S113'). FIGS. 2 and 3 respectively illustrate an exemplary system according to various embodiments of the present invention, which are configured to perform the methods for dynamic user Identity authentication (such as method 100), and the interaction among the devices/components for implementing the method of the present invention.

Before going through the method of the present invention, the basic devices of the system configured to implement the present invention are first discussed. Take the system 200 illustrated in FIG. 2 as an example, said system 200 comprises a web server 210, a login device 220, and a signing device 230.

As an example, Hypertext Transfer Protocol (HTTP) is used to transmit data across the World Wide Web; whereas the web server 210 is a computer system capable of processing the HTTP request or computer software for processing the HTTP request. The main function of the web server 210 is to store, process, and transmit the web content (e.g., texts, images, formats, scripts, etc.). The web server 210 could be disposed within a single system or device, or disposed across a distributed computing environment.

The login device 220 is an electronic device with a processor; to implement the present method, the login device 220 is further equipped with suitable input/output component and a communication component to allow the user access to the internet content and allow the login device 220 to interact with the web server 210 and the signing device 230. As could be appreciated, the login device 220 generally comprises a certain kind of storage medium; the storage medium comprises volatile and non-volatile, removable and non-removable media, and appropriate methods or technologies could be used so that these media can be used to store the desired information (e.g., computer-readable instructions, data structures, program modules, and other data). Examples of storage media comprise, but are not limited to, random access memory (RAM), read-only memory (ROM), electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the processor. Communication components typically implement computer-readable instructions, data structures, program modules, and other data into a variety of data signals, which can be transmitted over any communication media. By way of example but not limitation, communications media include wired media such as a wired network or direct-wired connection, and wireless media such as acoustic, infrared, radio, microwave, spread-spectrum, and other wireless media technologies. As an example, rather than a limitation, the login device 220 may be desktop computers, servers, laptop or hand-held devices, personal digital assistants (PDAs), multi-processor systems, microprocessor-based systems, set-top boxes, programmable consumer electronics and/or appliances, mobile phones (in particular smart phones), internet computers, minicomputers, mainframe computers, distributed computing environments that include any of the above systems or devices, and/or the like.

The signing device 230 is a device capable of performing the air signature procedure to generate a target signature; in particular, when the air signature procedure is initiated, the user is prompted to move the signing device 230, and the signing device 230 detects one or more motion features generated during such movement. To that end, the signing device 230 comprises a processor, storage medium, input device, output device and communication component to perform the air signature procedure and interact with other devices (e.g., the web server 210 and login device 220) of the present system; the components of the login device 220 described above are also applicable in the present signing device 230, and are omitted herein for the sake of brevity. Moreover, the signing device 230 further comprises at least a motion sensor for detecting the motion feature(s) of the user moving the signing device 230. The motion sensor comprises, for example, an accelerometer and a gyroscope. The accelerometer is configured to detect the linear acceleration; for example, the accelerometer may be a single-axis or multi-axis accelerometer. After the accelerometer measures the acceleration readings of the signing device 230 in each axis, it transmits these readings to the application executing the air signature procedure so that the application records the velocity of the signing device 230 in each axis. In preferred embodiments, the accelerometer provides a real-time three-dimensional acceleration data. Moreover, the accelerometer reading is further used to measure the acceleration effect that the gravity imposes on the signing device 230, in which the accelerometer readings in the X, Y and Z axes are used to calculate the tilt angle of the signing device 230 relative to the direction of the gravity. On the other hand, the gyroscope is configured to measure the angular velocity of the signing device 230 in each axis. The signing device 230 can be an electronic device capable of being subjected to the air signature action by the user; as could be appreciated, the signing device 230 should be easy-to-move, so that the user may carry out the air signature. By way of example but not limitation, the signing device 230 can be implemented as a mobile phone (in particular, a smart phone), PDA and other programmable consumer electronics. The programmable consumer electronics can be a tablet, wearable device (e.g., smart bracelet, smart phone, smart ring, etc.), or handheld input device (e.g., electronic pen, joystick, remote control, etc.); however, the present invention is not limited thereto.

According to some embodiments of the present invention, the signing device 230 further comprises a determination module 240 disposed therein. The determination module 240 is configured to compare the target signature received from the signing device 230 with the target signature of a pre-stored reference signature and to determine the similarity between the two.

Referring to both FIG. 1 and FIG. 2, which illustrate an exemplary dynamic user identity authentication method 100 (hereafter, the method 100). According to some embodiments of the present invention, in the user interactive step S201, when the user intends to access a specific internet service or content through the web server 210, he or she may use the login device 220 to transmit an access request, AR, to the web server 210.

According to the principles and spirits of the present invention, the specific internet service or content is an access-restricted resource, such as, account information, payment authorization, customized page, printing privilege, paid content, etc. Typically, the address at which the specific internet service or content to be accessed locates is the "resource address"; this address is often expressed as the uniform resource locator (URL).

Generally, when the user sends the access request AR, the present method uses a user agent (such as a web browser) stored in the login device 220 to initiate the communication between the login device 220 and the web server 210. For example, the user may enter the resource address information in the web browser, and then the browser presents a login page for the user to carry out the subsequent identity authentication step(s). In the present embodiment, the access request AR transmitted from the login device 220 comprises the resource address information.

According to some embodiments of the present invention, the air signature procedure described below is used for the user identity authentication, and accordingly, when the user sends the access request AR, it is not required to enter the user ID and/or password. However, in the cases where such information is necessary, it is feasible to require the user to enter the user ID or the user ID and password in the page first, and then submit this account and/or password information as a part of the access request AR that is transmitted to the web server 210.

In step S101 according to the present invention, the web server 210 receives the access request AR from the login device 220. Thereafter, the web server 210 in step S102 generates a resource locator information (URL) and a session ID (SID) based on the access request AR, and transmits the URL and SID to the login device 220 (the invention step S103 according to the present). For example, the web server 210 may convert the URL and SID into signal(s) to be received and recognized by the login device 220.

As could be appreciated, in some embodiments, a target address included in the access request entered during the present step S101 is the resource address at which the service or content to be accessed locates. In some other cases, the target address and the resource address are different addresses; that is, after the user entering the target address via the browser and finishing the identity authentication, the browser may direct to the address at which the service or content to be accessed locates and present the content thereof based on the resource address information generated by the web server 210 in step S103 according to the present invention.

In step S105 according to the present invention, after the login device 220 receives the signal comprising the URL and SID, it generates an initiation signal, I. The initiation signal I comprises the URL and SID. Additionally, it is feasible to encode the initiation signal into a coded version that can be received and recognized by the signing device 230; for example, the signal can be encoded into optically recognizable data, audio tones, or data for transmission over one or more communication protocols. Specifically, the optically recognizable data can be a quick response code (QR code), barcode, image, character string, or combination of light flickering frequencies, or a combination of thereof. As to the audio tones, it is feasible to encode the initiation signal I into a dual tone multi frequency (DTMF) signal, musical notes, phrases or human inaudible frequencies, or a combination of thereof. Moreover, the initiation signal I can be encoded into the data for transmission over any of the following communication protocols: near field communications (NFC), ad-hoc, WiFi, Bluetooth, Z-Wave, XBee, or others.

As could be appreciated, when the login device 220 converts the information such as the URL and SID into the initiation signal I using a desired coding, the login device 220 comprises an output component capable of transmitting the coded initiation signal I, while the signing device 230 also comprises an input component capable of receiving such signal. For example, the login device 220 may pack and convert the URL and SID into a QR code, and in this case, the login device 220 is equipped with a display to present this QR code, while the signing device 230 is furnished with an image-capturing apparatus (e.g., camera) to receive the input of the QR code. The above-mentioned coded signals, transmission apparatuses, and receiving apparatuses are exemplary, and the present invention is not limited thereto; persons having ordinary skills in the art may use other known or equivalent technologies and apparatuses in the art to implement the signal transmission between the login device 220 and the signing device 230.

Next, in step S107 according to the present invention, when the signing device 230 receives the initiation signal I, it initiates an air signature procedure, AS. The air signature procedure is a motion-based identity authentication method proposed by the present inventor. The air signature procedure is characterized in using a training session to create a set of reference signatures, and calculate the consistency level associated with the signatures; and using an authentication session to capture a target signature and compare it and the set of reference signatures, and when the target signature reaches the similarity threshold with respect to the reference signature, the authentication is considered passed, and the user is granted with the associated permission. In certain embodiments, the above-mentioned air signature procedure may identify the features of the air signature in less than 0.1 second, and the accuracy of the procedure is higher than 99%.

When the signing device 230 initiates the air signature procedure AS, it may present a reminder to the user using an appropriate means (such as, message, sound, vibration, flash, etc.), thereby prompting the user to make the air signature (user interactive step S203). In the meantime, the user may move the signing device 230, and the motion sensor disposed in the signing device 230 detects one or more motion features generated while the user moves the signing device 230, thereby generating the target signature, TS.

According to various embodiments of the present invention, the motion sensor of the signing device 230 may detect at least one of the following parameters: the movement direction, acceleration, and angular velocity of the signing device 230, so that the signing device 230 generates the target signature TS.

Next, in step S109 according to the present invention, the determination module 240 that is disposed within the signing device 230 is used to determine whether the target signature TS generated by the signing device 230 matches a reference signature, RS. In this case, the reference signature RS belongs to the set of the reference signatures captured and stored by the air signature procedure AS during the previous training session(s). According to various embodiments, the determination module 240 compares the similarity of one or more features of movement direction, acceleration and angular velocity between the target signature TS and the reference signature RS and generates a determination result. According to the principles and spirits of the present invention, when the determination module 240 determines that the similarity achieves or exceeds a pre-determined threshold, the determination module 240 determines that the target signature TS matches the reference signature RS.

According to optional embodiments of the present invention, the air signature procedure AS may store one or more reference signatures RS for a single signature (such as, John Smith). Moreover, the air signature procedure AS may store one or more reference signatures RS for different signatures (e.g., John Smith, John, Smith, J Smith, JS1, JS2, etc.), respectively. Furthermore, in optional embodiments, it is feasible to associate the permission to access a single restricted internet resource with one or more signature styles of various signature styles; alternatively, it is practicable to associate, respectively, the permissions to access several restricted internet resources with one or more signature styles of various signature styles. By way of example but not limitation, the user may use the air signature procedure AS to establish the following associations in advance: associating the signatures "John Smith," "J Smith" and "JS1" with a permission to access a first website; associating the signatures "John" and "Smith" with permissions to access a second and third websites, respectively; associating the signature "JS1" with the permission for online payment using a first credit card; and associating the signature "JS2" with the permission for online payment using a second credit card.

Typically, the air signature procedure can be implemented as one or more computer-executable instructions (e.g., program module); such computer-executable instructions can be executed by computers or various devices with equivalent processing capability (e.g., signing device 230). Generally, examples of the program module include, but are not limited to, routines, programs, objects, components, and data structures, which perform particular tasks or implement particular abstract data types. While using the system 200 illustrated in FIG. 2 to implement the method 100 for dynamic user Identity authentication, the air signature procedure is implemented in a single device (e.g., the signing device 230). However, it is also workable to implement the air signature procedure in a distributed computing environment; in this case, a plurality of remote processing devices connected via a communication network work cooperatively to perform the air signature procedure. In the distributed computing environment, each device may have its own memory component so as to store a portion of or the whole program module for implementing the air signature procedure (see, the description provided below in connection with FIG. 3).

After the determination module 240 makes the determination, in step S111 according to the present invention, the determination module 240 generates an authentication information, AI, based on the determination result, and then transmits the authentication information AI to the web server 210; for example, the determination module 240 may transmit the authentication information AI to the web server 210 via the communication component of the signing device 230. Specifically, the authentication information AI comprises a signature similarity information and the SID. The signature similarity information represents the similarity between the target signature TS and the reference signature RS. In one embodiment, the signature similarity information only represents the similarity as determined by the determination module 240. In alternative embodiments, signature similarity information further comprises a pre-determined similarity threshold, in addition to the above-mentioned similarity. Still alternatively, the signature similarity information is used to indicate whether the similarity between the target signature TS and the reference signature RS is greater than the predetermined similarity threshold.

Thereafter, the web server 210 determines whether the access request AR is granted based, at least, on the received authentication information AI.

According to some embodiments, in step S113 according to the present invention, the web server 210 makes the determination based on the signature similarity information in the authentication information AI; when the signature similarity information indicates that the target signature TS passes the authentication of the air signature procedure AS, in step S115 according to the present invention, the web server 210 grants the access request AR, and therefore allows the user the access of the restricted internet resource.

In some embodiments, the authentication information AI further comprises the device identifier of the signing device 230. On the other hand, it is feasible to store the device identifier associated with the signing device 230 in the web server 210 in advance. In this case, after step S111 according to the present invention, the method proceeds to step S113' according to the present invention, in which the web server 210 compares the device identifier of the signing device 230 that is used for performing the air signature procedure AS and the pre-stored associate device identifier and determines whether the two are the same; and then the web server 210 may determine whether the access request AR is granted based on the signature similarity information in the authentication information AI and the comparison result of the device identifiers. In step S115 according to the present invention, when the signature similarity information indicates that the target signature TS passes the authentication of the air signature procedure AS, and when the comparison result conducted by the web server indicates that the device identifier of the signing device 230 is the same as the associated device identifier, then the web server 210 accepts the access request AR, and therefore allows the user the access of the restricted internet resource. By using the dual mechanism of the air signature procedure AS and the comparison of the device identifiers, the security of the user account is further improved.

Alternatively, the authentication information AI may comprise no signature similarity information. For example, the signing device 230 only transmits the authentication information AI after the determination module 340 determines that the signature similarity satisfies or exceeds the threshold; such authentication information AI comprises the SID and device identifier so that the web server may make the comparison. In this case, the web server 210 determines whether the device identifier of the signing device 230 that is used for the air signature procedure AS is the same as the pre-stored associated device identifier, and makes a determination regarding whether the access request AR is granted based on the comparison result.

In addition to the system 200 described above, it is also feasible to use the system 300 illustrated in FIG. 3 to implement the method 100 for dynamic user Identity authentication. The system 300 illustrated in FIG. 3 is quite similar to the system 200 of FIG. 2; one main difference lies in that the determination module 340 is not disposed within the signing device 330; rather, the determination module 340 is disposed within an air signature server 350 and is communicatively connected with the signing device 330 and the web server 310, so as to receive the target signature TS from the signing device 330 and generate the authentication information AI after making the determination. Then, the air signature server 350 transmits the authentication information AI to the web server 310. According to alternative embodiments of the present invention, when the signing device 330 transmits the target signature TS to the determination module 340, it can also transmit the device identifier thereof to the determination module 340; also, when the determination module 340 generates the authentication information AI, the device identifier information, in the case where it is needed, this information may be further included in the authentication information AI.

The present invention also proposes another method for dynamic user Identity authentication; the method is characterized in that it uses the air signature authentication technology to improve the security of the user's account. Moreover, the present method uses a signing device without interacting with a web server, thereby providing a more convenient authentication procedure in case the connection between the signing device and the web server is limited.

Figure 4:
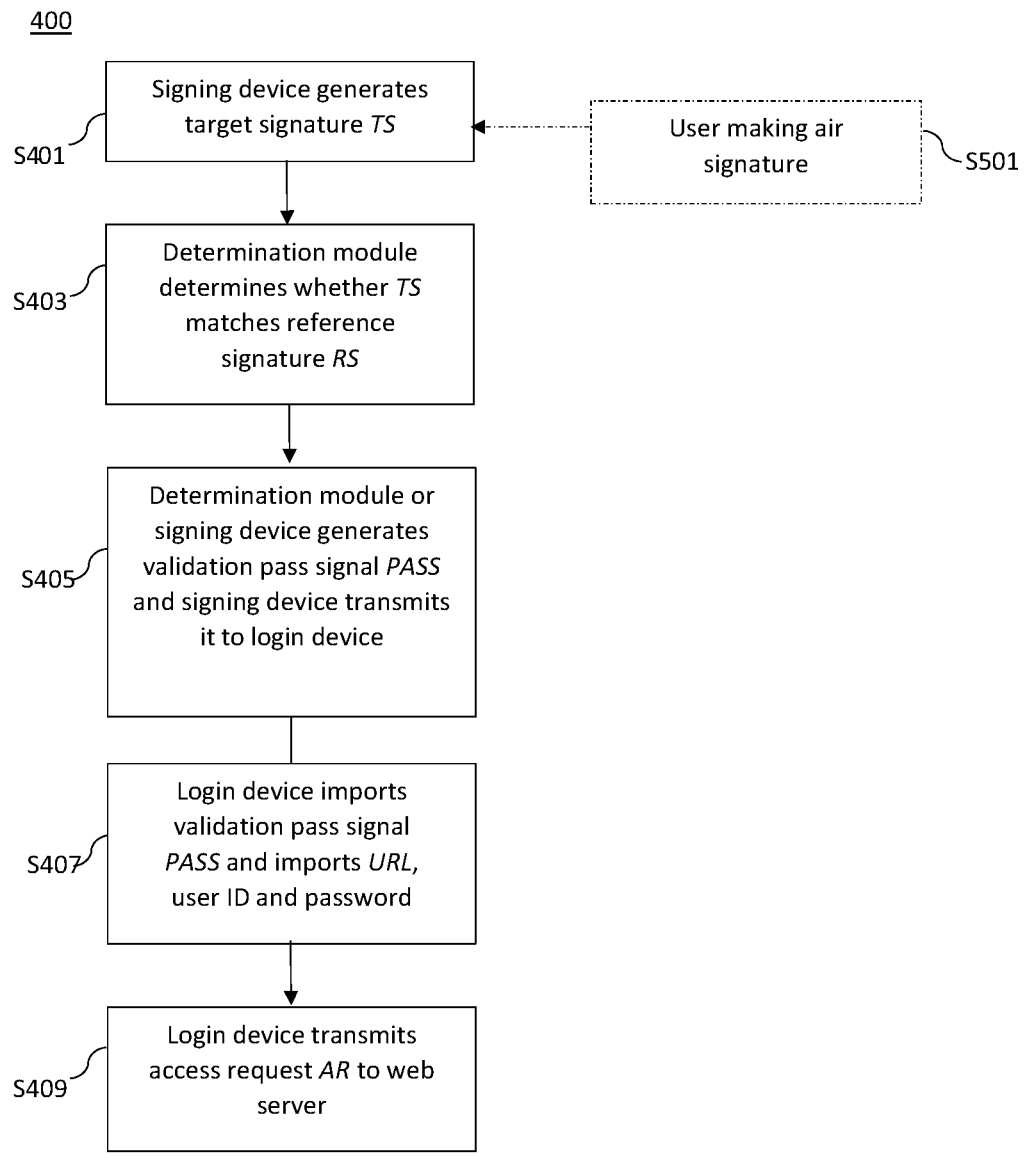
FIG. 4 is a flow chart illustrating a method for dynamic user Identity authentication according to another embodiment of the present invention.
Figure 5:
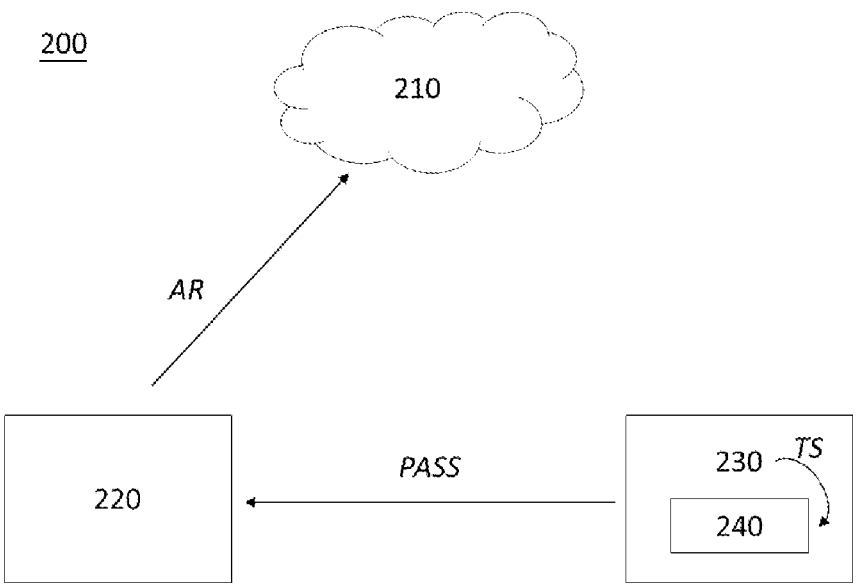
FIG. 5 is a schematic diagram of a system configured to perform the method 400 for dynamic user Identity authentication and the interaction among the devices/components.
Figure 6:
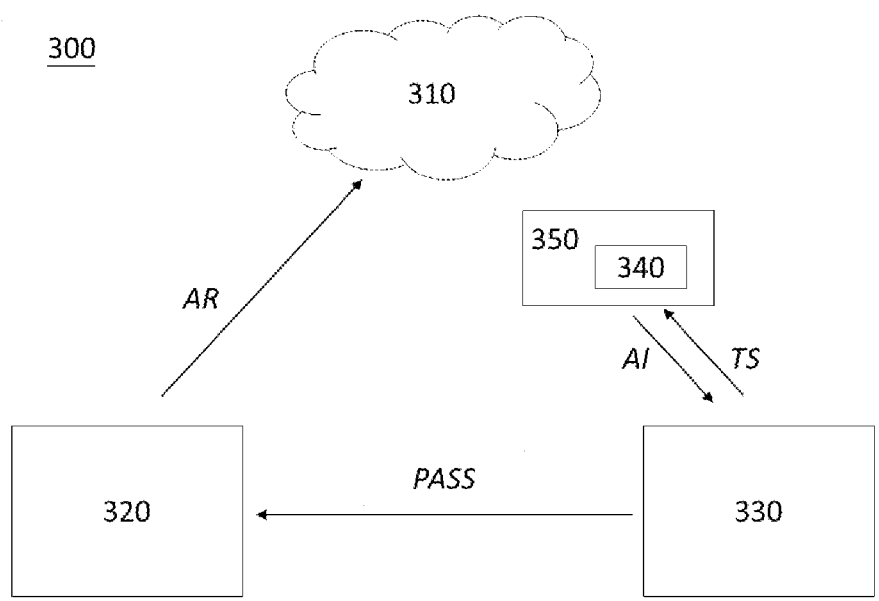
FIG. 6 is a schematic diagram of a system configured to perform the method 100 for dynamic user Identity authentication and the interaction among the devices/components.

The flow diagram in FIG. 4 directs to an exemplary method 400 for dynamic user Identity authentication; as illustrated the method steps of the present embodiments are illustrated as boxes of solid lines (steps S401-S409); while the step involving the user interaction is illustrated in dotted lines (step 501). FIGS. 5 and 6 respectively illustrate an exemplary system according to various embodiments of the present invention, which are configured to perform the methods for dynamic user Identity authentication (such as method 400), and the interaction among the devices/components for implementing the method of the present invention. The devices/components of the systems illustrated in FIG. 5 and FIG. 6 are the same as those illustrated in FIG. 2 and FIG. 3, respectively; the main difference therebetween is the interaction among devices/components in implementing the method for dynamic user Identity authentication; accordingly, only the differences are described below, while the structure of each device/component and the function thereof may be ascertain referring to the above description in connection with FIGS. 1 to 3.

According to embodiments of the present invention, the method 400 for dynamic user Identity authentication and system 200 are used to carry out the following user Identity authentication procedure. The user first initiates the air signature procedure using the signing device 230. For example, the user may select or enter the name or address of a restricted resource that he/she intends to access via a user interface of the air signature procedure, and then the user makes the air signature in the user interactive step S501.

When the user makes the air signature, the signing device 230 detects the motion feature resulted from the movement of the signing device 230, and generates a target signature, TS, in step S401 according to the present invention.

Then, in step S403, determination module 240 disposed in the signing device 230 is used to determine whether the target signature TS matches a reference signature RS, and make a determine result accordingly.

In step S405 according to the present invention, when the determination module 240 determines that a similarity between the target signature TS and the reference signature RS is higher than a threshold, the determination module 240 determines that the target signature matches the reference signature and generates a authentication pass indication, PASS. Still in step S405 according to the present invention, the signing device 230 encodes the authentication pass indication PASS into a suitable form and transmits the same to the login device 220. For example, the signing device 230 may encode the authentication pass indication PASS into a QR code to be captured by the image-capturing device of the login device 220.

In some optional embodiments, the authentication pass indication PASS further comprises a user ID and password, but without the URL. In this case, the method 400 comprises using the login device 220 to receive an input of the URL, and using the login device 220 to import the user ID and password in the authentication pass indication PASS. For example, in step S407 according to the present invention, the login device 220 may present a browser interface allowing the user to input the URL, and after the login device 220 receives the QR code, it automatically imports, from the QR code, the user ID and password required by the web server 210 that the URL directs to.

Alternatively, the authentication pass indication PASS further comprises both the URL and the user ID and password. In this case, the method 400 comprises using the login device 220 to import the URL and the user ID and password. In other words, in step S407 according to the present invention, after the login device 220 receives the QR code it presents a browser interface, in which the browser interface comprises the URL and the user ID and password that have been imported automatically from the QR code.

According to some optional embodiments, the authentication pass indication PASS further comprises the URL but without the user ID and password. In these embodiments, the login device 220 may further comprise a plugin module, which comprises a user ID and password stored therein; the present method 400 may use the plugin module to import the URL from the authentication pass indication, and then import the user ID and password stored in the plugin module. In these embodiments, the login device 220 presents an application interface for initiating the above-mentioned plugin module after receiving the QR code, in which the application interface import the URL encoded in the QR code and the user ID and password pre-stored in the plugin module (the step 407 according to the present invention).

Then, in step S409 according to the present invention, the login device 220 transmits an access request AR to the web server 210. According to the principles and spirits of the present invention, such access request AR comprises information about the URL and the user ID and password, and the web server 210 determine whether to grant or reject the user's access request AR for accessing the restricted resources.

Moreover, according to some embodiments of the present invention, method 400 for dynamic user Identity authentication may be used in the system 300. The difference between the system 200 in FIG. 5 and the system 300 in FIG. 6 is the same as those described above, and the following description is directed to the differences in connection with the method 400 of FIG. 4 and the system 200 of FIG. 6.

In the present embodiments, the user initiates an air signature procedure using the signing device 330 and makes the air signature by moving the signing device 330 (user interactive step S501). After the signing device 330 generates a target signature TS (the step S401 according to the present invention), the communication component is used to transmit the target signature TS to the determination module 340 (such as, the determination module 340 disposed within the air signature server 350, and then the determination module 340 is used to determine the similarity between the target signature TS and the reference signature RS (the step S403 according to the present invention). The determination module 340 generates an authentication information AI based on the above-mentioned determination result, and then uses the communication component of the air signature server 350 to transfer the same to the signing device 330. In step S405 according to the present invention, when the authentication information AI indicates that the similarity between the target signature TS and the reference signature RS is higher than a threshold, the signing device 330 determines that the target signature matches the reference signature and generates a authentication pass indication, PASS. Still in step S405 according to the present invention, the signing device 330 encodes the authentication pass indication PASS into a suitable type and transmits the same to the login device 320. Thereafter, in step 407 according to the present invention, after the login device 320 receives the authentication pass indication PASS, it may use any methods described above to import the URL encoded in the authentication pass indication PASS or inputted into the login device 220 by user using an input device of the login device 220, as well as import the user ID and password encoded in the authentication pass indication PASS or stored in the plugin module. Finally, in step S409 according to the present invention, the login device 320 transmits an access request AR to the web server 310, and the web server 210 determines whether to grant or reject the user's access request AR for accessing the restricted resources.

The above methods (100, 400) for dynamic user Identity authentication are described from an overall perspective in which the dynamic user Identity authentication procedure is carried out. As could be appreciated, the scope of the present invention also covers the method steps in which the action(s) is/are taken from any of the web server, the login device, the signing device, or the determination module.

From the perspective of the web server, the method for dynamic user Identity authentication according to some embodiments of the present disclosure comprising the steps of: (1) using a web server to receive an access request from a login device; (2) using the web server to generate a resource address information and a session ID based on the access request and transfer the same to the login device, wherein the login device generates an initiation signal comprising the resource address information and the session ID and transfers the same to a signing device, so that the signing device initiates an air signature procedure based on the initiation signal to generate a target signature, in which a motion sensor of the signing device is used to detect the motion feature resulted from the movement of the signing device, and after a determination module determines whether the target signature matches a reference signature, the determination module generates an authentication information and transmits the same to the web server, wherein the authentication information comprises a signature similarity information and the session ID; and (3) using the web server to determine whether the access request is granted based on the authentication information.

From the perspective of the login device, the method for dynamic user Identity authentication according to some embodiments of the present disclosure comprising the steps of: (1) using a login device to transmits an access request to a web server, wherein the web server generates a resource address information and a session ID based on the access request and transfers the same to the login device; and (2) using the login device to generate an initiation signal comprising the resource address information and the session ID and transfer the same to a signing device, so that the signing device initiates an air signature procedure based on the initiation signal to generate a target signature, in which a motion sensor of the signing device is used to detect the motion feature resulted from the movement of the signing device, after a determination module determines whether the target signature matches a reference signature, the determination module generates an authentication information and transmits the same to the web server, wherein the authentication information comprises a signature similarity information and the session ID, and using the web server to determine whether the access request is granted based on the authentication information.

From the perspective of the signing device, the method for dynamic user Identity authentication according to some embodiments of the present disclosure comprising the steps of: (1) when a web server receives an access request from a login device, the web server generates a resource address information and a session ID based on the access request and transfers the same to the login device, and when the login device generates an initiation signal comprising the resource address information and the session ID, using a signing device to receive an initiation signal and based on the initiation signal to initiate an air signature procedure so as to generate a target signature, wherein the signing device comprises a motion sensor configured to detect the motion feature resulted from the movement of the signing device; and (2) using a determination module of the signing device to determine whether the target signature matches a reference signature, so as to generate an authentication information, and transmit the same to the web server, wherein the authentication information comprises a signature similarity information and the session ID, so that the web server determines whether the access request is granted based on the authentication information.

From the perspective of the signing device, the method for dynamic user Identity authentication according to some embodiments of the present disclosure comprising the steps of: (1) when a web server receive an access request from a login device, and when the web server generates a resource address information and a session ID based on the access request and transfers the same to the login device, so that the login device generates an initiation signal comprising the resource address information and the session ID, using a signing device to receive an initiation signal and initiate an air signature procedure based on the initiation signal to generate a target signature, wherein the signing device comprises a motion sensor configured to detect the motion feature resulted from the movement of the signing device; and (2) using the signing device to transmit the target signature to a determination module, so that the determination module determines whether the target signature matches a reference signature, and the determination module generates an authentication information and transmits the same to the web server, wherein the authentication information comprises a signature similarity information and the session ID, and the web server determines whether the access request is granted based on the authentication information.

As could be appreciated, another aspect of the present invention is directed to a computer storage medium (e.g., program module). The computer storage medium having computer-readable instructions stored therein, which, when executed, are configured to perform the method for dynamic user Identity authentication according to various aspects/embodiments of the present invention. Take the program module as an example, the web server, login device, signing device and/or determination module configured to carry out the present method have stored therein a portion of or the entire program module, so that they work cooperatively to accomplish the method for dynamic user Identity authentication. Alternatively, a portion of or the entire program module may be stored in a device or at a location other than one or more of the web server, login device, signing device and determination module, and such program module (or portion(s) thereof) can be transmitted to these devices/components via an appropriate transmission mechanism when needed.

On the other hand, another aspect of the present invention is directed to a system configured to carry out the above method for dynamic user Identity authentication. For example, the system may comprise a login device and a signing device. In some embodiments, the system further comprises a web server and/or an air signature authentication server. The structures and functions of devices/components comprised in the system are described above.

It will be understood that the above description of embodiments is given by way of example only and that various modifications may be made by those with ordinary skill in the art. The above specification, examples, and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method for dynamic user Identity authentication, configured to authenticate the identity of a user of a login device during a login process, comprising the steps of,
   using a web server to receive an access request from the login device;
   using the web server to generate a resource address information and a session identifier (session ID) based on the access request and transfer the resource address information and the session ID to the login device;
   using the login device to generate an initiation signal comprising the resource address information and the session ID and transfer the initiation signal to a signing device;
   using the signing device to perform an air signature procedure based on the initiation signal for generating a target signature, wherein the signing device comprises a motion sensor, the motion sensor comprises an accelerometer and a gyroscope and is configured to detect a motion feature of the signing device, the motion feature comprises a movement direction, acceleration and angular velocity, the air signature procedure is performed to measure acceleration readings of the signing device in each axis by the accelerometer, measure the angular velocity of the signing device in each axis by the gyroscope, and calculate the movement direction and the acceleration according to the acceleration readings;
   using a determination module to compares the movement direction, acceleration and angular velocity of the target signature with a movement direction, acceleration and angular velocity of a pre-stored reference signature, calculate a similarity between the target signature and the reference signature, determine that the target signature matches with the reference signature when the similarity is greater than a threshold, generate an authentication information according to whether the target signature matches with the reference signature, and transfer the authentication information to the web server, wherein the authentication information comprises a signature similarity information and the session ID; and
   using the web server to determine whether the access request is to be granted based on the authentication information.

2. The method according to the claim 1, wherein the access request comprises a user identifier (user ID) or both of the user ID and a password inputted in the login device.

3. The method according to the claim 1, wherein the initiation signal is encoded as optically recognizable data, audio tones, or data for transmission over one or more communication protocols.

4. The method according to the claim 3, wherein the optically recognizable data is a quick response (QR) code, barcode, image, character string, or combination of light flickering frequencies.

5. The method according to the claim 1, wherein the authentication information further comprises a device identifier associated with the signing device and/or the login device, and the method further comprises the steps of, using the web server to compare the device identifier associated with the signing device and/or the login device and another device identifier stored in the web server in advance to obtain a comparison result; and
   using the web server to determine whether the access request is to be granted based on the signature similarity information and the comparison result.

6. The method according to the claim 1, wherein the determination module is disposed within the signing device.

7. The method according to the claim 1, wherein the determination module is disposed within an air signature server and communicatively connected with the signing device and the web server, the determination module receives the target signature from the signing device, generates the authentication information, and transmits the authentication information to the web server.

8. A method for dynamic user Identity authentication, configured to authenticate the identity of a user of a login device during a login process, comprising the steps of, using a web server to receive an access request from the login device;
  using the web server to generate a resource address information and a session ID based on the access request and transfer the resource address information and the session ID to the login device;
  using the login device to perform an initiation signal comprising the resource address information and the session ID and transfer the initiation signal to a signing device;
  using the signing device to initiate an air signature procedure based on the initiation signal for generating a target signature, wherein the signing device comprises a motion sensor comprising an accelerometer and a gyroscope, and is configured to detect one or more motion features of the signing device, the motion feature comprises a movement direction, acceleration and angular velocity, the air signature procedure is performed to measure acceleration readings of the signing device in each axis by the accelerometer, measure the angular velocity of the signing device in each axis by the gyroscope, and calculate the movement direction and the acceleration according to the acceleration readings;
  using a determination module to compares the movement direction, acceleration and angular velocity of the target signature with a movement direction, acceleration and angular velocity of a pre-stored reference signature, calculate a similarity between the target signature and the reference signature, determine that the target signature matches the reference signature when the similarity is greater than a threshold, wherein the determination module is disposed within the signing device, and when the target signature matches the reference signature, using the determination module to generate an authentication information and transmit the authentication information to the web server, wherein the authentication information comprises the session ID received from the login device and a device identifier associated with the signing device and/or the login device;
  using the web server to compare the device identifier and another device identifier stored in the web server in advance to obtain a comparison result; and
  using the web server to determine whether the access request is to be granted based on the comparison result.

9. The method according to the claim 8, wherein the access request comprises a user ID inputted into the login device or both of the user ID and a password.

10. The method according to the claim 8, wherein the initiation signal is encoded as optically recognizable data, audio tones, or data for transmission over one or more communication protocols.

11. The method according to the claim 10, wherein the optically recognizable data is a quick response (QR) code, barcode, image, character string, or combination of light flickering frequencies.

12. A method for dynamic user Identity authentication, configured to authenticate the identity of a user of a login device during a login process, comprising the steps of,
  using a signing device to perform an air signature procedure for generating a target signature, wherein the signing device comprises a motion sensor, the motion sensor comprises an accelerometer and a gyroscope and is configured to detect a motion feature of the signing device, the motion feature comprises a movement direction, acceleration and angular velocity, an air signature procedure is stored with the signing device and performed by the singing device to measure acceleration readings of the signing device in each axis by the accelerometer, measure the angular velocity of the signing device in each axis by the gyroscope, and calculate the movement direction and the acceleration according to the acceleration readings;
  using a determination module to compares the movement direction, acceleration and angular velocity of the target signature with a movement direction, acceleration and angular velocity of a pre-stored reference signature, calculate a similarity between the target signature and the reference signature, determine that the target signature matches the reference signature when the similarity is greater than a threshold; and
  when the target signature matches the reference signature, using the determination module to generate an authentication pass indication and transfer the authentication pass indication to the login device by the singing device, wherein the authentication pass indication comprises a resource address information and/or a combination of a user ID and a password.

13. The method according to the claim 12, wherein when the authentication pass indication comprises only the combination of the user ID and the password, then the method further comprises the step of using the login device to receive an input of the resource address information and import the user ID and the password in the authentication pass indication for authenticating the identity of the user and completing the login process.

14. The method according to the claim 12, wherein when the authentication pass indication comprises the resource address information and the user ID and the password, then the method further comprises the step of using the login device to import the resource address information and the user ID and the password for authenticating the identity of the user and accomplishing the login process.

15. The method according to the claim 12, wherein when the authentication pass indication comprises only the resource address information, then the login device comprises a plugin module having stored therein the user ID and the password, and the method further comprises the step of using the plugin module to first import the resource address information in the authentication pass indication and then import the user ID and the password for authenticating the identity of the user and completing the login process.

* * * * *